(12) United States Patent
Igarashi

(10) Patent No.: US 6,988,710 B2
(45) Date of Patent: Jan. 24, 2006

(54) FLOW REGULATING DEVICE

(75) Inventor: Hiroki Igarashi, Honjo (JP)

(73) Assignee: Surpass Industry Co., Ltd., Saitama-ken (JP)

( * ) Notice: Subject to any disclaimer, the term of this patent is extended or adjusted under 35 U.S.C. 154(b) by 72 days.

(21) Appl. No.: 10/843,513

(22) Filed: May 10, 2004

(65) Prior Publication Data

US 2004/0262565 A1    Dec. 30, 2004

(51) Int. Cl.
*F16K 17/30* (2006.01)
(52) U.S. Cl. .................. 251/368; 251/366; 137/468
(58) Field of Classification Search ............... 251/366, 251/368; 137/468
See application file for complete search history.

(56) References Cited

U.S. PATENT DOCUMENTS 6,047,726 A * 4/2000 Kaneshige ................. 137/468

FOREIGN PATENT DOCUMENTS

JP           6-201063       7/1994

* cited by examiner

Primary Examiner—J. Casimer Jacyna
(74) Attorney, Agent, or Firm—Thelen Reid & Priest LLP

(57) ABSTRACT

The flow regulating device has a shape preservation member which surrounding the environment of a flow conduit and restricts the amount of heat deformation of a housing in the housing. The shape preservation member is made from a material whose amount of heat deformation is lower than that of the housing. Furthermore, the shape preservation member includes a first metal plate member positioned on one side of the flow conduit, a second metal plate member positioned on the other side of the flow conduit, a spacer which maintains a constant interval between the first and second plate members, and bolts which fix together the first and second plate members via the spacer. In this flow regulating device, while maintaining excellent chemical resistance by making a housing from resin, accurate flow amount regulation over a wide temperature range can be performed.

18 Claims, 4 Drawing Sheets

FLOW REGULATING DEVICE

BACKGROUND OF THE INVENTION

1. Field of the Invention

The present invention is related to a flow regulating device which controls the flow amount of a liquid chemical or pure water or the like, and is related to Patent Application No. 2002-328116, filed Nov. 12, 2002, the content of which is incorporated herein by reference.

2. Description of Related Art

FIG. 4 is a sectional figure which shows an example of the construction of a prior art type flow regulating device. This type of flow regulating device 1 is one which is used in a supply line for the flow of a fluid, when mixing together a plurality of different liquid chemicals, or when accurately regulating the flow amount of pure water or the like which is to be used for a manufacturing process for a product. Furthermore, a flow regulating device 1 which is used for this sort of application is also sometimes generally termed a"regulator".

The structure of this flow regulating device 1 will now be explained concretely. Its housing, which presents its external aspect, is made from a material such as resin or the like, and it comprises a fluid intake port 21 and a fluid outlet port 24 which are formed upon its exterior. Furthermore, in the interior of this housing 10, as main components, there are provided a valve seat 11 which comprises an opening surface 11a which is communicated to the intake port 21, a valve element 30 which shifts in the vertical direction with respect to this opening surface 11a of the valve seat 11 (the upwards and downwards direction in the figure), a diaphragm 35 which is fixed on the upper surface of this valve element 30, and a spring 36 which presses the valve element 30 towards the valve seat 11. It should be understood that it is per se conventional to make this valve element 30 as two members, as shown in the figure.

Furthermore, the flow conduit in which the fluid flow is taking place is made up from a first plenum 22 which connects from the intake port 21 to the valve element 30 (generally this is termed the "valve chamber"), and a second plenum 23 which is positioned between the valve seat 11 and the diaphragm 35 and connects to the outlet port 24.

In addition, a closed pressure chamber 12 is defined on the other side of the diaphragm 35 from the second plenum 23, in other words on the upper side of the diaphragm 35 as seen in the figure, and this pressure chamber 12 is communicated with a pressure inflow port 13 which is formed in the upper portion of the housing 10.

The structure incidental to the valve element 30, and the operation of the valve element 30, will now be explained.

By the lower portion of the outer peripheral portion of the valve element 30, which is its end portion, being inserted in a valve element insertion groove 25 which is formed in the housing 10, the valve element 30 can shift in the upwards and downwards direction in the drawing along an axial line which is perpendicular. Furthermore, this valve element 30 is pressed from downwards in the upwards direction by a spring 36 which is provided below it, within the valve element insertion groove 25. In other words, by pressing the valve element 30 against the valve seat 11, this spring fulfills the function of closing the valve seat 11.

On the upper portion of the valve element 30, there is formed a projecting spiral screw portion 30a, and the valve element 30 and the diaphragm 35 are mutually fixed together by this projecting spiral screw portion 30a being screwed into a spiral screw portion which is formed in the diaphragm 35. It should be understood that, according to the particular structure, the valve element 30 and the diaphragm 35 may not be fixed together.

Furthermore, when air or the like is supplied from the pressure inflow port 13, the pressure chamber 12 is pressurized, and the diaphragm 35 experiences a force which overcomes the elastic force of the spring 36, so that the diaphragm 35 is pressed downwards. Due to this, the valve element 30 which is fixed to the diaphragm 35 is removed from the valve seat 11 and the opening surface 11a of the valve seat 11 is opened, so that the fluid which has filled up the first plenum 22 flows into the second plenum 23. Since at this time the shifting distance in the upwards and downwards direction of the valve element 30 varies according to the degree of pressurization of the pressure chamber 12, the flow amount of fluid which passes through the opening surface 11a of the valve seat 11 comes to be regulated thereby. In addition, by the flow amount which has flowed into the second plenum 23 flows toward the outlet port 25 and being ejected therefrom, it becomes possible to perform the regulation of the flow amount of fluid which passes through the flow regulating device 1.

The flow regulating device 1 of this type of structure is one which has been disclosed in various published prior arts; some of these are ones in which, instead of the above described air which causes the position variation of the diaphragm 35, there is provided a flow regulation mechanism of a needle type, in which a diaphragm is pressed inwards by a screw (for example, refer to Japanese Patent Application, First Publication No. Hei 6-201063).

This type of flow regulating device 1 may be provided in a circuit and may fulfill the function of performing flow amount regulation of, for example, the flow of a liquid chemical, or of pure water for the manufacture of semiconductor devices or the like. As a result, deviation can arise in such flow amount regulation, due to variation over a short time period of the temperature of the fluid whose flow amount is to be regulated, or due to variation of the temperature of the external environment. This can cause the result that the temperature range over which it is possible to perform accurate flow amount regulation may be severely limited.

Furthermore, the flow conduit in which the above described type of flow regulating device is provided, and which is adapted for the flow of a liquid chemical, may be formed by a resin material such as a fluorinated resin which has excellent chemical resistance and provided in the housing. However, since this type of resin material has a rather great amount of heat deformation as compared to metallic materials of the flow regulating device, it can sometimes happen that, due to deviation occurring at the sealing surface of the flow conduit, the sealing structure may be destroyed. This may be caused because the temperature distribution at the various portions of the housing is different.

By a sealing surface here is meant the sealing surface between the inner wall of the housing 10 and the diaphragm 35 shown in FIG. 4, or a sealing portion K which constitutes a sealing construction and including a stepped portion having a sealing surface or the like at each of several portions which make up the housing 10, or an O ring, or the like; and, when change of shape takes place in this type of portion due to heat deformation, there is a possibility of the sealing construction being destroyed, of the pressure reducing, and of leakage of the fluid.

Furthermore, as well, with regard to the valve element insertion groove 25 which is formed below the valve element 30 and which governs the operating direction of the valve element 30, it may also be predicted that it may be deformed by change of the temperature of the flowing fluid in the same manner as described above, by change of the temperature of the external environment, or by rise of temperature or abrasion due to friction with the valve element 30. In such a case, a gap may appear between the inner peripheral surface of the valve element insertion groove 25 and the outer peripheral surface of the valve element 30, and, not only the problem may arise that the groove direction of the valve element insertion groove 25 may become tilted with respect to the perpendicular direction, or the like, but a problem may arise in the smooth shifting of the valve element 30 along the perpendicular axial direction, so that it may become impossible to maintain the opening amount of the valve seat 11 fixed in accordance with the value to which the flow amount is to be regulated.

The present invention has been conceived in the light of the above described situation, and its objective is to provide a flow regulating device which is capable of performing accurate flow amount regulation over a wide range of temperature, while maintaining the qualities of excellent chemical resistance by utilizing a flow conduit which is formed in a housing which is made from a resin material.

SUMMARY OF THE INVENTION

In order to achieve the above described objectives, the present invention proposes a flow adjustment device comprising a housing which is made from a resin material, and, within the housing, an intake port and an outlet port for fluid, a flow conduit which is disposed between these two ports, a valve seat which is formed in the flow conduit, and a valve element which controls the opening and closing of the valve seat; and wherein, within the housing, a shape preservation member which generally surrounds the environment of the flow conduit, and which is made from a material the amount of heat deformation of which is less than that of the material of the housing, thus restricting the amount of heat deformation of the housing, is provided.

According to this structure, heat deformation of the housing caused by variation of temperature of the fluid which is flowing through the flow conduit, or by change of temperature of the area in which the device is set up, or the like, is suppressed by the provision of the shape preservation member which is made from a material whose amount of heat deformation is lower than that of the material from which the housing is made, so that it is possible to preserve the shape of the flow conduit and of its surroundings. As a result, for example, it is possible to prevent leakage at the sealing surface, and it is possible to perform accurate regulation of the flow amount even if the temperature of the flowing fluid varies.

In this flow regulating device, it is preferable that the shape preservation member comprises a first plate member which is made from metal and which is positioned on one side of the flow conduit, a second plate member which is made from metal and which is positioned on the other side of the flow conduit, a spacer which maintains a constant interval between the first plate member and the second plate member, and a fixing member which fixes the first plate member and the second plate member via the spacer.

According to this structure, the flow conduit, the surroundings of the flow conduit, and the valve seat and the valve element which constitute portions of the flow conduit and so on are positioned so as to be sandwiched between the first plate member and the second plate member which are both made of metal and which are arranged with a fixed interval between them. Therefore, even if, as a result of change of temperature of the flowing fluid or the like, an attempt is made to deform the portions such as the flow conduit and its surroundings and so on which are sandwiched between the first plate member and the second plate member by heat, since the first plate member and the second plate member are not greatly deformed by this application of heat. Consequently, no great heat deformation occurs to these portions which are sandwiched between these plate members. In other words, change of the shape of the portions related to the flow conduit, such as for example the sealing surface and the valve seat and so on, is suppressed, and they are restricted to fixed positions within the housing. This matter is due to the fact that the first plate member and the second plate member are kept at a specific interval apart due to the dimensions of the spacer, and accordingly heat deformation between the first plate member and the second plate member comes to be completely restricted by this interval. That is, the shape of the flow conduit and of its surroundings are precisely maintained, and do not experience undue negative effect from change of the temperature of the flowing fluid or the like. Therefore, simply by using this low cost additional structure, it is possible to implement a flow regulating device which is capable of performing accurate flow amount regulation even for a flowing fluid whose temperature is varying. Furthermore, since this reinforcing structure is provided within the housing which is made from a resin material, accordingly it is possible to implement a flow regulating device with which accurate flow regulation can be obtained, even if the device is subjected to a shock from externally.

Furthermore, the present invention also proposes a flow regulating device comprising a housing which is made from a resin material, and, within the housing, an intake port and an outlet port for fluid, a flow conduit which is disposed between these two ports, a valve seat which is formed in the flow conduit, and a valve element which controls the opening and closing of the valve seat; and wherein, in a valve element insertion groove which is formed at the end of the operation of the valve element within the housing and governs the direction of operation of the valve element within the housing, a valve element guide member which is made from a material the amount of heat deformation of which is less than that of the material of the housing, is provided.

According to this structure, the possibility that, due to heat deformation or the like, the valve element insertion groove which governs the direction of operation of the valve element could become no longer able to govern the direction of operation of the valve element, is avoided. In other words, due to the provision of the valve element guide member which is made from a material which is different from the material of the housing in the valve element insertion groove which is formed in the housing which is made from resin, the construction of the above described valve element insertion groove comes to be reinforced with respect to the influence of the application of heat, and deformation due to, for example, variation of the temperature of the flowing fluid, variation of the temperature of the external environment, or deformation of the valve element by friction, or heating of the valve element generated by slight sliding action of the valve element, is avoided, and the operational direction of the valve element and the smooth operation of the valve element are always maintained. Due to this unstable operation of the valve element, such as tilting, juddering, or severe vibration thereof, can be eliminated in any temperature region, and the valve element comes to shift smoothly and precisely along its predetermined axial line. As a result, during operation of the valve element, an opening amount of the valve seat comes to be obtained which corresponds accurately and moreover stably to the regulation value for the flow amount. Therefore, it is possible to enhance the accuracy of regulation of the flow amount through the valve seat, even if the device is utilized for controlling the flow of a fluid whose temperature is varying, or in an external environment whose temperature is varying, or the like. It should be understood that, as the material for the valve element guide member, it is desirable for it to be made from a resin which has allows the valve element to slide smoothly and which has excellent corrosion resistance, and a resin will be acceptable which is one which is less deformed by heat than is the material of which the housing is made.

The above valve element guide member may be provided with the above-described flow regulating device in which the shape preservation member is provided.

According to this structure, even in circumstances such as ones in which a negative influence upon the regulation of the flow amount is being exerted, an appropriate flow amount of liquid comes to be allowed to flow through the flow conduit whose heat deformation, along with that of its surroundings, is regulated by the provision of the shape preservation member. Moreover, the opening amount of the valve seat is stabilized by the guidance of the operation of the valve element which is provided by the valve element guide member which is made from a material the amount of heat deformation of which is less than that of the material of the housing. Therefore, it is possible to flow as appropriate flow amount past the valve seat, in correspondence to any desired regulation value for this flow amount. Consequently, it is possible to implement a flow regulating device which can perform accurate flow amount regulation even in circumstances in which it is suffering variation of temperature, and moreover whose reliability is high.

DETAILED DESCRIPTION OF THE INVENTION

In the following, various preferred embodiments of the flow regulating device according to the present invention will be explained with reference to the drawings.

First Preferred Embodiment

Figure 1:
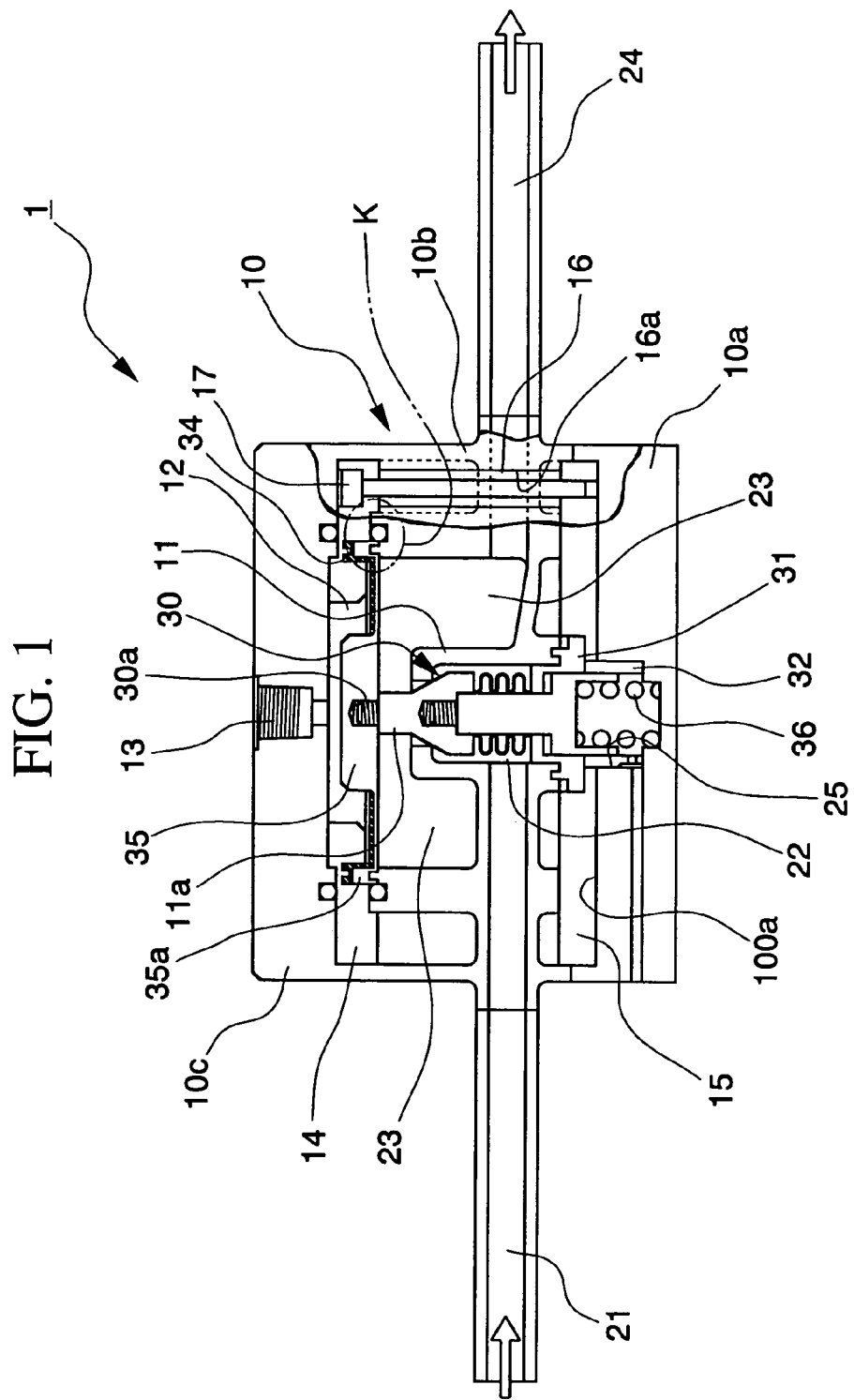
FIG. 1 is a cross sectional view showing the structure of a flow regulating device according to a first preferred embodiment of the present invention.
Figure 2:
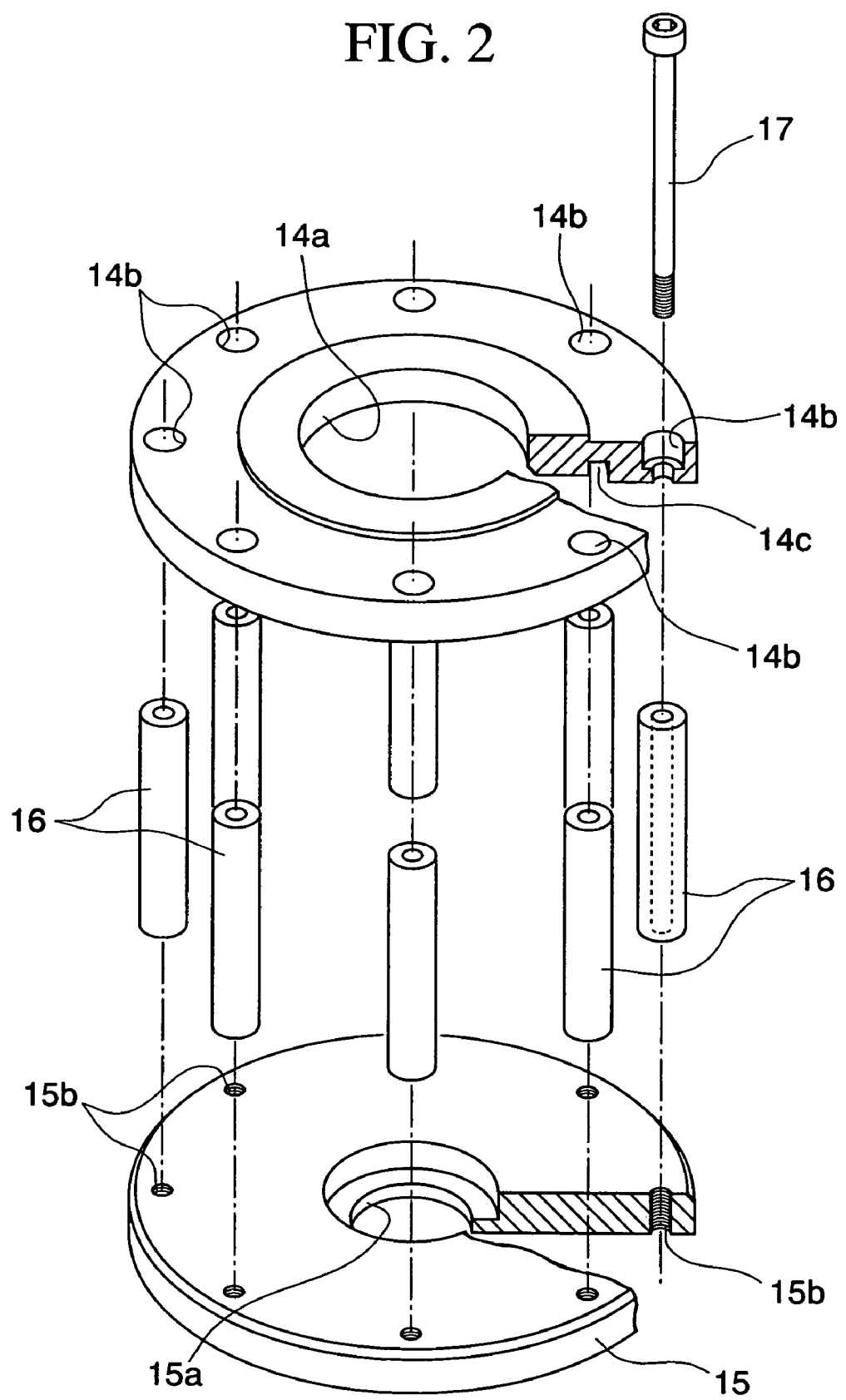
FIG. 2 is a perspective view for explanation of the overall structure of a shape preservation member which is utilized in this flow regulating device according to the first preferred embodiment of the present invention.
Figure 3:
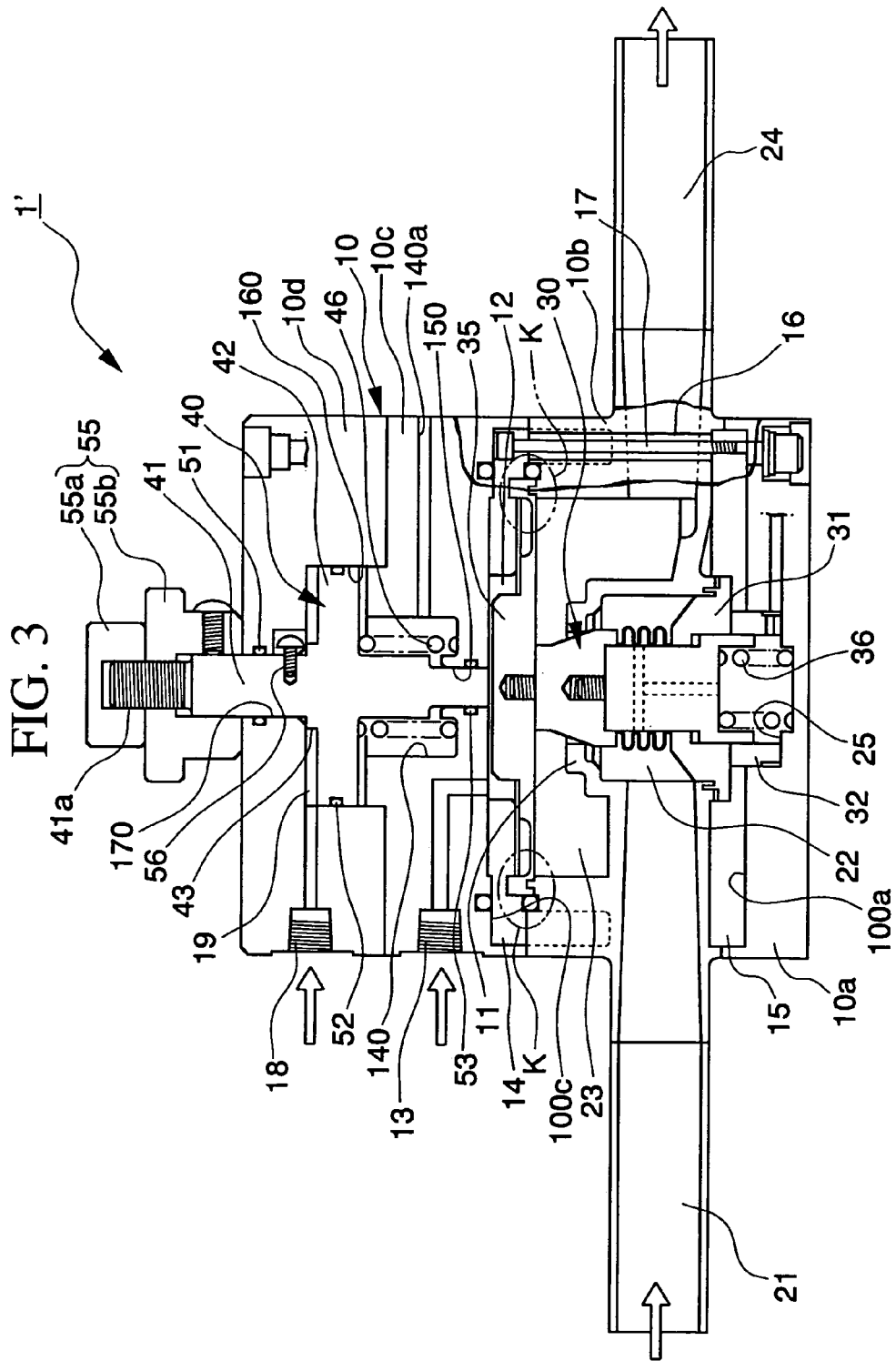
FIG. 3 is a sectional figure for explanation of the structure of a flow regulating device according to a second preferred embodiment of the present invention.
Figure 4:
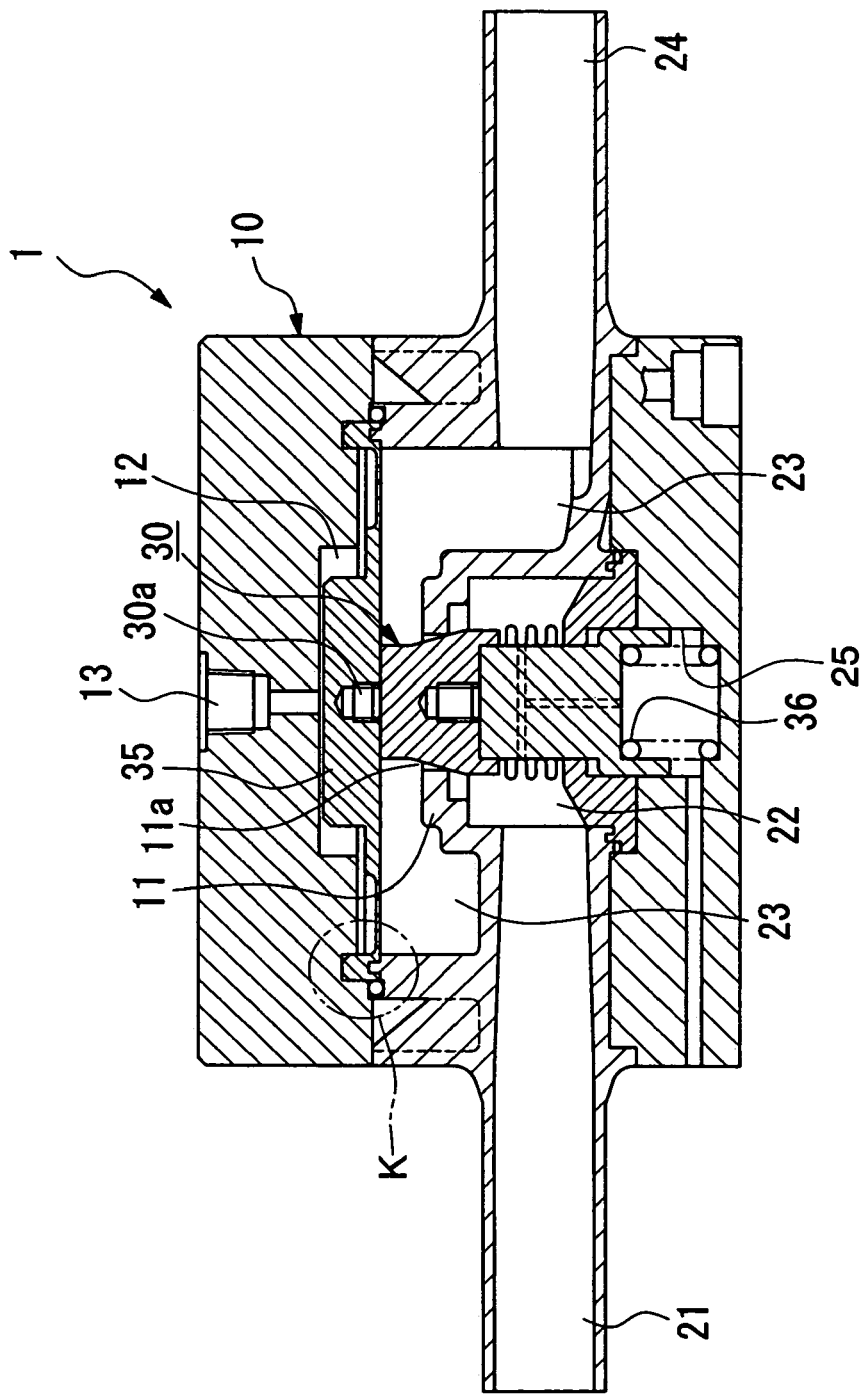
FIG. 4 is a sectional figure for explanation of the structure of a prior art type flow regulating device.

FIG. 1 is a sectional figure for explanation of the internal structure of the flow regulating device according to the first preferred embodiment of the present invention. And FIG. 2 is a perspective view for explanation of the structure of a shape preservation member which is provided within its housing. In this embodiment the rated flow amount which is supplied from an outlet port 24 of the flow regulating device 1 which is explained here is from 4 to 35 liters/minute. In addition, in the explanation of the basic construction for regulating the rated flow amount within the above range, the explanation of portions thereof will be curtailed herein, since they are almost the same as the structure of the flow regulating device 1 which has been explained above with respect to FIG. 4, so that the detailed explanation will focus upon the structure of the portions which are related to the present invention.

A housing 10 which gives this flow regulating device 1 its external appearance and shape comprises an assembly of three blocks 10a, 10b, and 10c which are made from a material such as a polypropylene resin (hereinafter termed "PP resin") or a fluororesin which is endowed with excellent chemical resistance (hereinafter termed "PFA resin") or the like, and plate members 14 and 15 which are made of stainless steel (SUS304 or the like), which are disposed by being inserted between these blocks 10a, 10b, and 10c, and which constitute a shape preservation member according to the present invention. It should be understood that, since the flow subject material for this flow regulating device is pure water or liquid chemical, processing with "Teflon" (a registered trademark) is performed upon the various components which make up the shape preservation member, in order to enhance their chemical resistance.

Proceeding to the explanation of the various blocks 10a, 10b, and 10c, the first block 10a constitutes a base portion of the flow regulating device 1, and is made from PP resin.

Furthermore the second block 10b, which is positioned above the first block 10a and constitutes an intermediate portion of the flow regulating device 1, comprises an intake port 21, an outlet port 24, and a valve chamber 22 and a second plenum 23; and, including its flow conduits and so on, it is made from PFA resin which has excellent chemical resistance.

Furthermore, the third block 10c is also made of PFA resin, and is positioned above the second block 10b and constitutes an upper portion of the flow regulating device 1. The third block 10c presses and holds a diaphragm 35 against the second block 10b, and forms an upper part of a pressure chamber 12 and a pressure inflow port 13 which supplies air to the pressure chamber 12 above the diaphragm 35.

The above described diaphragm 35 is arranged between the second block 10b and the third block 10c. The detailed structure of this diaphragm 35, in this first preferred embodiment of the present invention, is that the diaphragm 35 consists of a thin membrane with a diaphragm reinforcement member 34 affixed to it for the purpose of reinforcing it. It should be understood that, since this diaphragm reinforcement member 34 is not a member which is absolutely required for this first preferred embodiment of the present invention, accordingly in the following explanation it will be assumed that it is included in the diaphragm 35.

As for the material of this diaphragm reinforcement member 34, a rubber plate may be used which has excellent pliability, and it is formed in a round plate shape matched to the shape of the diaphragm 35, with the central portion omitted. Furthermore, a ring shaped convex portion 35a of the diaphragm 35, and a fitting in shape which can be fixed in a ring groove 14c of a first plate member 14 which will be described hereinafter, are formed upon the upper and lower sides of this peripheral edge portion.

This type of diaphragm reinforcement member 34 makes it possible to fulfill the function of keeping the strength under deformation sufficiently high, while maintaining the diaphragm 35 itself thin and keeping its deformation under pressure sufficient. In other words, it maintains the strength of the diaphragm 35 for resisting the pressure in the pressure chamber 12.

Furthermore, the first plate member 14, which is a one of the plate members which have been described above, is formed in a round plate shape which matches the shape of the housing 10 which, as shown in FIG. 2, is shaped as a circular tube; and, in its central portion, there is formed a through hole 14a for defining the pressure chamber 12 which is formed above the diaphragm 35. Yet further, upon the outer peripheral portion of this first plate member 14, at equal intervals around its edge portion, there are provided a total of eight (8) bolt fixing holes 14b of stepped shape, which are made so that bolts 17 (fixing member) which will be described hereinafter can be fitted therein. Moreover, upon the under surface of this first plate member 14, more to the inside than the above described bolt fixing holes 14b, there is provided a ring shaped groove 14c for insertion of a ring shaped convex portion 35a (in detail, including the peripheral edge portion of the diaphragm reinforcement member 34) which is provided at an outer peripheral portion of the diaphragm 35. It should be understood that, as shown in FIG. 1, this first plate member 14 is made to be arranged by being inserted into a circular shaped groove 100c which is formed upon the under surface of the third block 10c.

Yet further, the second plate member 15, which is another one of the plate members which have been described above, is also formed in a round plate shape, the same as that of the first plate member 14, which matches the shape of the housing 10 which, as shown in FIG. 2, is shaped as a circular tube; and, in its central portion, there is formed a through hole 15a for defining an operating plenum for the valve element 30. Yet further, upon the outer peripheral portion of this second plate member 15, at equal intervals around its edge portion, there are provided a total of eight (8) threaded holes 15b (fixing member), which are made so that the end portions of the bolts 17 which are fitted through the holes 14b of the first plate member 14 can be screwed thereinto. It should be understood that, as shown in FIG. 1, this second plate member 15 is made to be arranged by being inserted into a circular shaped groove 100c which is formed upon the upper surface of the first block 10a.

As shown in FIG. 2, the first plate member 14 and the second plate member 15 are fixed together by a plurality of bolts 17 with spacers 16 between them. Each of these spacers 16 is a tube which is made from stainless steel (SUS304 or the like), and they are all of the same length, and they serve the function of keeping the space between the first plate member 14 and the second plate member 15 almost constant, with hardly any heat deformation being caused in them due to the supply of heat. It should be understood that although, in the shown structure, the first plate member 14 and the second plate member 15 are very effectively fixed by the bolts 17 being provided just at the points where the spacers 16 are provided and being inserted inside and through these spacers 16, it is not absolutely necessary to match together the positions of the various spacers 16 and the various bolts 17 exactly.

Furthermore, in this flow regulating device 1 of this first preferred embodiment of the present invention, in the valve element insertion groove 25 which is formed upon the upper surface of the first block 10a which governs the direction of operation of the valve element 30, there is provided a valve element guide member 32 of a tubular shape which is made from a material such as poly-3-fluoroethylene resin or the like (hereinafter termed "PCTFE resin"), the amount of heat deformation of which is less than that of the PP resin which is the material for the first block 10. This valve element guide member 32 is contacted against the lower outer peripheral surface of the valve element 30, which is its end portion, and it serves the function of supporting the valve element 30 in a slidable manner, as this valve element 30 moves. It should be understood that the reference symbol 31 denotes a guide member which faces the outer peripheral portion of the valve element 30 and supports the operation of the valve element 30, thus controlling its shifting in the vertical direction, which is its direction of operation. Moreover, it should be understood that, since the portion of this guide member 31 which constrains the valve element 30 is a thickened portion of the valve element 30, it is not as good as the valve element guide member 32, from the point of view of functioning to support the operation of the valve element 30.

According to the operation of the device which is structured as described above, the following functional results are obtained.

By varying the temperature of the flowing fluid over a range of, for example 10° C. to 90° C., and the like, even though this exerts an effect of deforming by heat the second block 10b which is surrounded by the first plate member 14 and the second plate member 15, nevertheless, no great heat deformation takes place in the second block 10b which is surrounded by these first and second plate members 14 and 15, since the first plate member 14 and the second plate member 15 are not greatly deformed due to this supply of heat. Furthermore, no deterioration of the function as a flow path occurs, even while, for example, some heat deformation is taking place, since the shapes of the various portions which are located between both the plate members 14 and 15 are preserved by being held together between these plate members 14 and 15.

In other words, even if an attempt is made to change the shape of the sealing surface related to the flow conduit which is formed in the second block 10b, or, to put it in another manner, of the seal portion K which constitutes the seal between the upper surface of the second block 10b and the lower surface of the third block which has the plate member 14, generation of deviation is avoided, because the surface pressure upon the seal portion K is maintained. This is due to the fact that the first plate member 14 and the second plate member 15 are restricted, along their entire lengths, to being spaced apart by the interval which has been determined and standardized by the spacer 16, and is because the heat deformation at the interface between the first plate member 14 and the second plate member 15 is completely restricted within this interval between them.

Furthermore, by arranging the valve element guide member 32 which is made from PCTFE resin in the valve element insertion groove 25 which is formed in the first block 10a which is made from PP resin, the structure of the valve element insertion groove 25 is reinforced with respect to the influence of supplied heat. In other words, no deformation takes place in this valve element guide member 32 due to change of the temperature of the flowing fluid, change of the temperature of the external environment, or generation of heat or abrasion due to minute binding of the valve element or the like, so that it becomes possible always to keep the frictional resistance low.

Due to this, it is possible for the valve element 30 to operate under the influence of temperature variations and the like, while avoiding the occurrence of tilting, juddering, or excessive vibration, and accordingly it becomes possible for the valve element 30 to shift smoothly and moreover accurately along a predetermined axial line. As a result, an opening amount of the valve seat 11 during the operation of the valve element 30 is always obtained accurately and moreover stably, according to the value for regulation of the flow amount.

With the flow regulating device according to the first preferred embodiment of the present invention as explained above, it is possible to obtain the following beneficial results.

Since it is possible to prevent leakage at the sealing surface of the seal portion K or the like by avoiding heat deformation of the flow conduit portions of the housing 10, it is possible to cause a precise flow amount to flow in the flow conduit, even if it is required to perform regulation of the amount of the flowing fluid while, for example, the temperature varies over a range from 10° C. to 90° C. Furthermore, by accurately governing the opening amount of the valve seat 11 with the valve element 30, it is possible to perform accurate flow amount regulation even if the temperature of the flowing fluid varies within such a temperature range as described above. These facts imply an implementation of a significant enlargement of the temperature range over which the device of the present invention can be utilized, in comparison with the temperature range over which the prior art can be utilized. Furthermore, this type of reinforcing construction is provided within the housing 10 which is made from a resin material, accordingly it becomes possible to maintain accurate regulation of the flow amount, even if the device is subjected to shock from the outside.

It should be understood that although, with this first preferred embodiment of the present invention, the shape preservation member was made by assembling various components made from stainless steel which had been subjected to processing with "Teflon" (a registered trademark), the present invention is not to be considered as being limited to the use of such a material; for example, it would also be acceptable to utilize any material, such as aluminum or the like, whose coefficient of linear expansion is less than that of the material which is used for the housing 10.

Furthermore, although this first preferred embodiment of the present invention has been explained in terms of the use of PCTFE resin as the material for the valve element guide member 32, the present invention is not to be considered as being limited to the use of such a material. For example, it would also be acceptable to utilize any material, such as PVDF (polyvinylidene fluoride resin) or stainless steel or the like, whose coefficient of linear expansion is less than that of the material which is used for the main portions of the housing 10. In this case, it is desirable to utilize a material which has excellent chemical resistance.

Second Preferred Embodiment

Next, a flow regulating device 1' according to a second preferred embodiment of the present invention will be explained. It should be understood that this flow regulating device 1' according to the second preferred embodiment of the present invention differs from the above described flow regulating device 1 according to the first preferred embodiment of the present invention by the addition of a supplemental structure for hyper-fine operation of the valve element 30, the structure and operation related to this feature will be described in detail, while, as far as the other structures of this device 1' are concerned, the explanation thereof will be partially curtailed, since they are the same as in the case of the first preferred embodiment described above.

The flow regulating device 1 of this second preferred embodiment of the present invention which is shown is one which comprises a piston 40 which somewhat presses downwards the valve element 30, via a diaphragm 35, in order to prevent the fluid which is flowing in the flow conduit from stagnating, and the structure which operates this piston 40 will now be explained.

Upon the upper surface of the third block 10c there is formed a concave portion 140, in which are fitted the piston 40 which will be described hereinafter and a spring 46 which presses this piston 40 in the upwards direction as seen in the figure, and a cutout hole 140a which communicates to the exterior of the housing 10 is formed in this concave portion 140. And the spring 46 and the lower end of the piston 40 are arranged so as to be inserted into this concave portion 140.

A concave portion 160 is formed in a fourth block 10d which is positioned above the third block 10c for receiving the upper end of the piston 40 in its central portion, and moreover, in the central portion of said concave portion 160, there is formed a through hole 170 for projecting a shaft portion 41 of the piston 40 to the outside of the housing 10, with the diameter of this through hole 170 corresponding to the outer diameter of the shaft portion 41. It should be understood that an O ring 51 is provided upon the inner circumferential surface of this through hole 170, in order to prevent leakage of pressure to the outside.

Furthermore, upon the side surface of the third block 10c, there is formed a second pressure inflow port 18 for supplying air towards the piston 40. To specify the side of the piston 40 to which the air is supplied more particularly, a round plate portion 42 is formed here upon the piston 40 which matches the shape of the concave portion 160 and which has a diameter which is almost equal to the diameter of said concave portion 160.

In addition, by forming the plenum which is defined by the upper surface of this round plate portion 42 (its upper surface as seen in the drawing) and the concave portion 160, in other words, the above described plenum to which air is supplied, as a second pressure chamber 19, a structure is constituted which promotes the operation of the piston 40 in the upward and downward direction due to pressure. Moreover, in order to prevent leakage of the air which is supplied to this second pressure chamber 19 as has been previously explained, in addition to the O ring 51 upon the shaft portion 41, another O ring 52 is also provided upon the outer peripheral surface of this round plate portion 42.

The upper surface of the round plate portion 42 of the piston 40 to which air is supplied is a pressure receiving surface for receiving the pressure of the air which is supplied from the second pressure inflow port 18. By the action of the pressure of the air upon this pressure receiving surface, force acts upon the piston 40 so as to push the piston 40 in the downward direction in the drawing. Furthermore, in contrast to this action, the piston 40 is pressed upwards in the drawing by the spring 46 which is provided upon the side of the third block 10c.

Accordingly, when a force which is sufficient to overcome the force of elasticity of the spring 46 acts upon the pressure receiving surface, and moreover if it is the case that a dial 55 which will be described hereinafter has released the piston 40, then the piston 40 is appropriately shifted in the upwards and downwards direction.

Furthermore, by forming a step 43 upon the joining portion between the round plate portion 42 and the shaft portion 41 (it should be understood that the round plate portion 42 and the shaft portion 41 are made as a unitary member), the second pressure chamber 19 will be always maintained as a plenum, so that the state is maintained in which the air which is supplied from the second pressure inflow port 18 always acts properly upon the pressure receiving surface.

A threaded portion 41a is formed upon the upper portion of the piston 40, in other words, upon the upper end of the shaft portion which projects from the housing 10, and a dial 55 is attached at the upper end of this shaft portion 41 by screwing a threaded portion thereof over said threaded portion 41a. This dial 55 comprises an upper dial portion 55a and a lower lock portion 55b, and the position of the dial 55 may be fixed at any position upon the threaded portion 41a which is formed upon the shaft portion 41 by tightening up this double nut type structure in the appropriate position.

Due to this, when the piston 40 is in the state in which it is not being operated in the upwards and downwards direction by the air which is being supplied, the dial 55 may be shifted in the upwards direction by turning the dial 55, and thereafter the double nut structure should be tightened up. Accordingly, a gap is formed between the lower surface of the dial 55 and the upper surface of the housing 10, and s a result, it becomes possible to ensure that the stroke of the piston 40, i.e. the amount by which it can shift in the upwards and the downwards direction, is set to any desired value.

Furthermore, a pin 56 is fitted to the upper end of the shaft portion 41 of the piston 40, and thereby, when any attempt is made to rotate the dial 55, it is possible to prevent such operation by contact occurring between this pin 56 and a cutaway portion which is formed upon the fourth block.

The lower end of the shaft portion 41 of the piston 40 is inserted into a through hole 150 which is pierced in the upper surface of the diaphragm 35, and thus a construction is provided which can press upon the diaphragm 35, when the piston 40 is shifted in the downward direction by receiving supply of air from the second pressure inflow port 18.

Furthermore, another O ring 53 is provided at the inner circumferential surface of the through hole 150, in order to prevent the air which is supplied into the first pressure chamber 12 from leaking into the concave portion 140 in which the piston 40 is contained.

Next, the operation of the valve element 30 by the piston 40 will be explained. When the flow of the fluid is to be cut off, and air for flow amount regulation is not supplied from the pressure inflow port 13, air is supplied from the second pressure inflow port 18, according to requirements, in order to operate the piston 40 to a very slight amount. As a result, the piston 40 receives a force which overcomes the elastic force of the spring 46 and shifts in the downward direction and is driven downwards, and the diaphragm 35 is pressed downwards by the lower end of the shaft portion 41.

The degree of pressing down at this time is determined in practice by the stroke which is set by the position at which the dial 55 which is provided at the upper end of the shaft portion 41 is fixed, and, via the diaphragm 35, the valve element 30 comes to be separated by a small amount from the valve seat 11.

Furthermore, due to the opening surface 11a of the valve seat 11 being opened by a small amount, the flow of the fluid which is flowing in from the intake port 21 is squeezed down to a very small flow amount which is adjusted within a very small range of 0.1% to 10% of the rated flow amount of the device, and then comes to flow through towards the outlet port 25.

As has been explained above, according to this flow regulating device 1' of this second preferred embodiment of the present invention, in addition to the benefits which were reaped in the case of the first preferred embodiment described above, it also becomes possible to flow the fluid through the flow conduit in a minute flow amount. Due to this, it becomes possible to prevent the occurrence of biological contamination such as bacteria or the like in the flowing liquid, by avoiding stagnation of the flow.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A flow regulating device comprising:
    a housing which is made from a resin material, and an intake port and an outlet port for fluid, and a flow conduit, which is disposed between these two ports, are provided therein;
    a valve seat which is formed in said flow conduit;
    a valve element which controls the opening and closing of said valve seat; and
    a shape preservation member which is provided in said housing and surrounds an environment of said flow conduit, and is made from a material an amount of heat deformation of which is less than that of a material of said housing, for restricting an amount of heat deformation of said housing.

2. A flow regulating device according to claim 1, wherein said shape preservation member comprises a first plate member which is made from metal and which is positioned on one side of said flow conduit, a second plate member which is made from metal and which is positioned on the other side of said flow conduit, a spacer which maintains a constant interval between said first plate member and said second plate member, and a fixing member which fixes said first plate member and said second plate member via said spacer.

3. A flow regulating device according to claim 1, wherein in a valve element insertion groove within said housing, a valve element guide member which restricts a direction of operation of said valve element, and which is made from a material an amount of heat deformation of which is less than that of a material of said housing, is provided.

4. A flow regulating device according to claim 2, wherein in a valve element insertion groove within said housing, a valve element guide member which restricts a direction of operation of said valve element, and which is made from a material an amount of heat deformation of which is less than that of a material of said housing, is provided.

5. A flow regulating device according to claim 3, wherein the material for the valve element guide member is made from a resin which has excellent corrosion resistance.

6. A flow regulating device according to claim 4, wherein the material for the valve element guide member is made from a resin which has excellent corrosion resistance.

7. A flow regulating device according to claim 1, wherein it is possible to continuously flow the fluid through the flow conduit in a minute flow amount to avoid stagnation of the flow.

8. A flow regulating device according to claim 2, wherein it is possible to continuously flow the fluid through the flow conduit in a minute flow amount to avoid stagnation of the flow.

9. A flow regulating device according to claim 3, wherein it is possible to continuously flow the fluid through the flow conduit in a minute flow amount to avoid stagnation of the flow.

10. A flow regulating device according to claim 4, wherein it is possible to continuously flow the fluid through the flow conduit in a minute flow amount to avoid stagnation of the flow.

11. A flow regulating device according to claim 7, wherein said minute flow amount is range of 0.1% to 10% of a rated flow amount of the flow regulating device.

12. A flow regulating device according to claim 10, wherein said minute flow amount is range of 0.1% to 10% of a rated flow amount of the flow regulating device.

13. A flow regulating device according to claim 9, wherein said minute flow amount is range of 0.1% to 10% of a rated flow amount of the flow regulating device.

14. A flow regulating device according to claim 10, wherein said minute flow amount is range of 0.1% to 10% of a rated flow amount of the flow regulating device.

15. A flow regulating device comprising:

a housing which is made from a resin material, and an intake port and an outlet port for fluid, and a flow conduit, which is disposed between these two ports, are provided therein;

a valve seat which is formed in said flow conduit; and a valve element which controls the opening and closing of said valve seat;

wherein in a valve element insertion groove within said housing, a valve element guide member which restricts a direction of operation of said valve element, and which is made from a material an amount of heat deformation of which is less than that of a material of said housing, is provided.

16. A flow regulating device according to claim 15, wherein the material for the valve element guide member is made from a resin which has excellent corrosion resistance.

17. A flow regulating device according to claim 15, wherein it is possible to continuously flow the fluid through the flow conduit in a minute flow amount to avoid stagnation of the flow.

18. A flow regulating device according to claim 17, wherein said minute flow amount is range of 0.1% to 10% of a rated flow amount of the flow regulating device.

* * * * *